INVENTORS
Gilbert R. Crowther
Joseph P. Goodman
BY
ATTORNEY

Patented June 27, 1939

2,163,667

UNITED STATES PATENT OFFICE 2,163,667

THERMAL EXPANSION STEAM TRAP

Gilbert R. Crowther and Joseph P. Goodman, New York, N. Y., assignors of one-third to George H. Pings, New York, N. Y.

Application April 7, 1937, Serial No. 135,469

1 Claim. (Cl. 236—56)

Our invention relates to improvements in steam traps, particularly to a thermal expansion steam trap, and it is the principal object of our invention to provide such a steam trap which is equipped with a hollow metal bellows, diaphragm or other expanding medium to which an adjusting screw is rigidly attached for permitting a regulation of the bellows and its co-operating parts according to changes in the temperatures of the condensate, while a piston, also rigidly connected to the bellows, covers and uncovers, openings in the wall of the cylinder in which the piston reciprocates, to permit a control of the flow or discharge of the condensate flowing from the trap to the return line.

Another object of our invention is the provision of a steam trap of the above type permitting the use of metals with a calculated expansion coefficient producing a steam seal without impediment in the operation of the moving parts of the trap.

Still another object of our invention is the provision of a thermal expansion steam trap in which a shoulder formed within the cylinder limits the travel of the piston for forming a secondary steam seal within the trap.

A further object of our invention is the provision of a steam trap equipped with a deflector or protector for the cylinder, said protector extending down into the water reservoir space at the bottom of the trap body, thus forming a water seal and protecting the cylinder openings against live steam until the expanding medium has moved the piston and covered the cylinder openings.

A still further object of our invention is the provision of an expansion spring surrounding the deflector and operating from a shoulder of the trap body and tapering inwardly to make contact with the base of the thermal expansion element to create a tension against the expansion of this element and helping to break the vacuum influence on the piston area when the expansion element has reached its contracting period.

Other objects of our invention are the provision of a steam trap of the character above set forth equipped with a drain plug of a special design in the bottom of the trap which permits a ready cleaning of the trap while in service and easy insertion of the plug after cleaning, and the provision of a thermal expansion steam trap, the body of which is provided with external radiation fins to conduct heat away from the trap.

These and other objects and advantages of our invention will become more fully known as the description thereof proceeds, and will then be specifically defined in the appended claim.

In the accompanying drawing, forming a material part of this disclosure:

Figure 1:
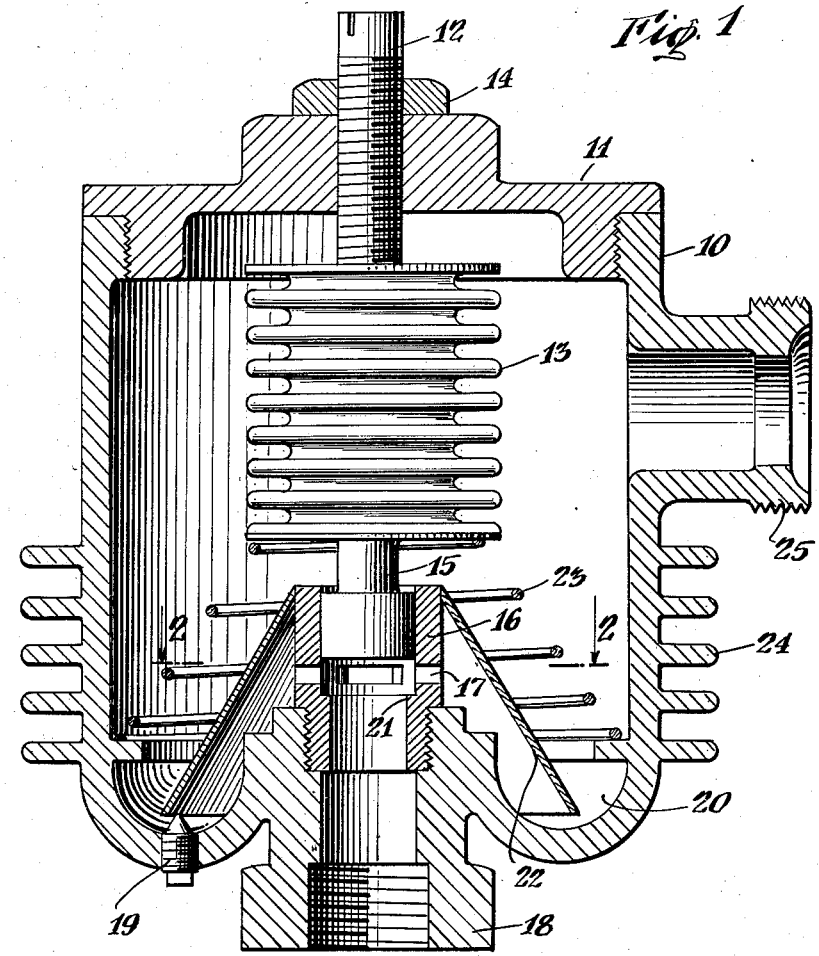
Fig. 1 is a vertical sectional elevation of the thermal expansion trap constructed according to our invention.
Figure 2:
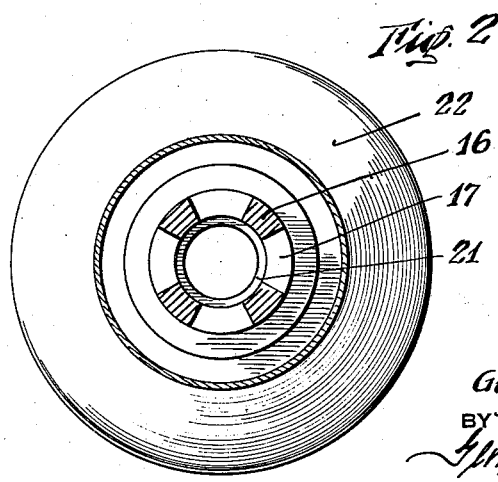
Fig. 2 is a section on line 2—2 of Figure 1.

As illustrated, the body or housing 10 of the steam trap is equipped at its top with a shouldered and threaded bonnet 11 through which extends an adjustment screw 12 into the trap within which it is rigidly connected to the hollow metal bellows, diaphragm or other expansion medium 13, while a locknut 14 provided for a locking of the screw in any of its adjusted positions.

Also rigidly connected to the bellows at its underside is a piston 15 reciprocating within a cylinder 16 having its walls provided with openings 17. The lower offset end of the cylinder is threaded into the trap body at its connection 18 leading to the boiler drain or other suitable place, while a drain plug 19 of special design permits cleaning of the trap from the water and sediments collecting in the water reservoir 20 during service and easy insertion of the plug after such cleaning.

A shoulder 21 in the cylinder limits the travel of the piston and forms a secondary steam seal. A deflector or protector member 22 depending from the cylinder and surrounding the same has its skirt extending down into the water reservoir 20. A compression spring 23 surrounding the deflector is operating from the upper shoulder of the cylinder and tapers inwardly to make contact with the base of the thermal expansion element 13. Heat radiation fins 24 on the lower outer part of the trap body conduct the heat away from the trap body, and a suitable connecting nipple 25 provided with an outer thread allows the connection of the trap to a radiator or the like.

In operation, the amount of the condensate escaping from the cylinder through its openings will always be proportionate to the area of the opening, and can be regulated by the proper adjustment of the thermostatic element. Inasmuch as the shoulder within the cylinder limits the travel of the piston, a secondary steam seal will be formed so that just sufficient steam will be admitted into the trap to compensate for the losses, and a constant temperature will be maintained, and the valve will assume a position in which the ports are just sufficiently open to permit all of the condensate to escape therethrough. The compression spring contacting with the base of the thermal member is to counterbalance the vacuum influence on the piston valve area.

It will be understood that we have described and shown the preferred embodiment of our invention as one example only of the many possible ways to practically construct the device, and that we may make such in its general arrangement and in the construction of the minor details thereof as come within the scope of the appended claim without departure from the spirit of our invention and the principles involved.

Having thus described our invention, what we claim as new, and desire to secure by Letters Patent is:

In a steam trap as described, a housing having at its top a shouldered and threaded bonnet, an adjustable expansion medium in said housing, an adjustment screw extending from the outside into the trap body through said bonnet and connected to the upper end of said expansion medium and adapted to be locked in any of its adjusted positions, a multiported cylinder in said trap having its lower, offset end threaded into the trap body at its connection with a boiler conduit, an inner shoulder in said cylinder, the lower part of the trap formed into a sediment chamber and having a plug closed draining opening for cleaning said sediment chamber, a piston rigidly connected to the underside of said expansion medium, and vertically reciprocating in said cylinder and cooperating with the ports of said cylinder to form a primary seal, said cylinder limited in its downward movement by engagement with said cylinder shoulder to form a secondary steam seal, a skirted deflector or protector member depending from the upper portion of said cylinder and surrounding the same to extend with its skirt into said sediment chamber, an expansion spring surrounding said deflector and resting with its lower outer portion on a shoulder in the trap body, said spring tapering inwardly and making contact with the base of the expansion medium to constitute a tensioning means against the expansion of said expansion medium to counterbalance the vacuum influence on the piston area, a radiator connection for said trap, and heat radiating means on the lower part of the trap housing.

GILBERT R. CROWTHER.
JOSEPH P. GOODMAN.